United States Patent [19]

Pitochelli

[11] Patent Number: 5,707,546
[45] Date of Patent: *Jan. 13, 1998

[54] GENERATION AND STORAGE OF CHLORINE DIOXIDE IN A NON-AQUEOUS MEDIUM

[75] Inventor: Anthony R. Pitochelli, Kingwood, Tex.

[73] Assignee: Rio Linda Chemical Co., Inc., Sacramento, Calif.

[*] Notice: The term of this patent shall not extend beyond the expiration date of Pat. No. 5,405,549.

[21] Appl. No.: 416,153

[22] Filed: Apr. 4, 1995

Related U.S. Application Data

[60] Continuation-in-part of Ser. No. 64,756, May 19, 1993, Pat. No. 5,405,549, which is a division of Ser. No. 716,638, Jun. 17, 1991, abandoned.

[51] Int. Cl.$^6$ ................................................ C01B 11/02
[52] U.S. Cl. .................... 252/187.21; 206/524.1; 206/524.4; 422/1; 422/28
[58] Field of Search ............... 206/524.4, 524.5, 206/524.6, 524.1; 252/186.36, 187.21, 187.23, 187.24, 187.25, 187.26, 187.27; 422/477, 478, 1, 28

[56] References Cited

U.S. PATENT DOCUMENTS

| | | | |
|---|---|---|---|
| 2,323,594 | 7/1943 | Hampel | 23/152 |
| 2,436,134 | 2/1948 | Aston et al. | 423/477 |
| 2,484,402 | 10/1949 | Day et al. | 23/152 |
| 2,614,690 | 10/1952 | Stoneman | 206/524.6 |
| 2,678,922 | 5/1954 | Stone | 252/187 |
| 2,683,651 | 7/1954 | Williamson et al. | 23/152 |
| 3,056,270 | 10/1962 | Grubitsch | 62/48 |
| 3,074,548 | 1/1963 | Parks | 206/524.5 |
| 3,084,995 | 4/1963 | Grubitsch et al. | 23/152 |
| 3,216,559 | 11/1965 | Forbes et al. | 206/524.5 |
| 4,081,520 | 3/1978 | Swindells et al. | 423/478 |
| 4,105,546 | 8/1978 | Kobayashi et al. | 210/610 |
| 4,247,531 | 1/1981 | Hicks | 423/477 |
| 4,250,144 | 2/1981 | Ratigan | 422/112 |
| 4,590,057 | 5/1986 | Hicks | 423/477 |
| 4,594,239 | 6/1986 | Pluim, Jr. | 424/10 |
| 4,715,983 | 12/1987 | Ota et al. | 206/524.4 |
| 4,786,492 | 11/1988 | Ratcliff | 424/53 |
| 4,793,931 | 12/1988 | Stevens et al. | 251/342 |
| 4,861,514 | 8/1989 | Hutchings | 252/187.21 |
| 5,037,520 | 8/1991 | Harry et al. | 206/524.5 |
| 5,405,549 | 4/1995 | Pitochelli | 252/187.21 |

FOREIGN PATENT DOCUMENTS

| | | |
|---|---|---|
| 1207269 | 7/1986 | Canada. |
| 60-101195 | 6/1985 | Japan. |
| 60-12912-2 | 7/1985 | Japan. |
| 60-129122 | 7/1985 | Japan. |
| WO8903179 | 4/1989 | WIPO. |

OTHER PUBLICATIONS

Chemical Abstract (15):7025C.
Quentin et al., *Z. Wasser Abwasser Forsch*, "Determination of Chlorine Dioxide and Chlorite in Drinking Water", 1984, pp. 50–62.

(List continued on next page.)

*Primary Examiner*—Sharon Gibson
*Assistant Examiner*—Valerie Fee
*Attorney, Agent, or Firm*—Leonard Bloom

[57] ABSTRACT

A method of preparing and storing a stable solution of chlorine dioxide in a non-aqueous, water-immiscible liquid. An aqueous solution of chlorine dioxide is vigorously mixed with a non-aqueous, water immiscible liquid and, in a single extraction, the chlorine dioxide is extracted into the non-aqueous liquid. The aqueous and non-aqueous phases are separated and the chlorine dioxide containing non-aqueous liquid is stored in a closed light-free environment. In an alternate embodiment, gaseous chlorine dioxide is introduced into the non-aqueous, water-immiscible liquid. Concentrations of 2,000 mg to 17,000 mg chlorine dioxide per liter are obtained. The chlorine dioxide in the non-aqueous liquid is stabilized for at least one month. A highly purified aqueous solution of chlorine dioxide is prepared by mixing the non-aqueous solution of chlorine dioxide with water and extracting chlorine dioxide into the water.

13 Claims, 5 Drawing Sheets

OTHER PUBLICATIONS

Masschelein et al., *Chlorine Dioxide:* Chemistry and Environmental Impact of Oxychlorine Compounds, Ann Arbor Science Publishers, Ann Harbor, Mich., 1979, pp. 9–11, 123–126, and 138–140.

Derwent Abstract: 86–204701 (Canadian Patent 1207269) Jul. 8, 1986.

The Merck Index, 1983, 10th Ed. p. 294.

Hartung, G.; Quentin, K.E., "Determination of Chlorine Dioxide and Chlorite in Drinking-Water", Z. Wasser Abwasser Forsch. (1984) 17(2), pp. 50–62.

Morrison and Boyd, "Organic Chemistry", 4th Ed., p. 94. (1980).

Jalowiczor, J., "Reaction of Chlorine Dioxide With Organic Compounds XIII", Zesz. Nauk. Politech. Szczecin., Chem., (8), pp. 105–115, CA71(15):70256c. (1968).

Masschelein, W.S., "Chlorine Dioxide: Chemistry and Environmental Impact of Oxychlorine Compound", Ann Arbor Science Publishers, Inc. (1979), pp. 138–140.

Kirk, R.E. and Othmer, D.F., "Encyclopedia of Chemical Technology", Interscience Publishers (1949), vol. 3, p. 696.

GENERATION AND STORAGE OF CHLORINE DIOXIDE IN A NON-AQUEOUS MEDIUM

CROSS-REFERENCE TO RELATED APPLICATIONS

This application is a continuation-in-part of application Ser. No. 08/064,756 filed on May 19, 1993, now U.S. Pat. No. 5,405,549, which in turn is a division of application Ser. No. 716,638 filed on Jun. 17, 1991, now abandoned, the disclosures of which are incorporated by reference herein in their entirety.

FIELD OF THE INVENTION

This invention relates to chlorine dioxide, a process for the generation and storage of chlorine dioxide and more particularly for chlorine dioxide in a non-aqueous medium.

BACKGROUND OF THE INVENTION

Chlorine dioxide is a highly active chemical which has been widely used in a variety, of processes and especially in disinfecting, sterilizing and bactericidal applications. Due to the unstable nature of gaseous chlorine dioxide when compressed, it is commonly prepared on site rather than having it placed in a container and shipping the container for usage at a site when and where needed. Liquid chlorine dioxide is considered to be very hazardous and is generally avoided.

The prior art discloses numerous procedures and generators for the preparation of chlorine dioxide. A partial listing of these are as follows:

| U.S. Pat. No. | Inventor(s) | Issued |
|---|---|---|
| 2,323,594 | Hampel | 07/05/43 |
| 2,436,134 | Aston | 02/07/48 |
| 2,484,402 | Day et al | 10/11/48 |
| 4,081,520 | Swindells | 03/28/78 |
| 4,250,144 | Rategan | 02/10/81 |
| 4,247,531 | Hicks | 01/27/81 |
| 4,590,057 | Hicks | 05/20/86 |
| 4,861,514 | Hutchings | 08/29/89 |

All current commercial processes for generation of chlorine dioxide involve methods for combining sodium chlorate or sodium chlorite with acids or oxidizing agents in aqueous systems. The chlorine dioxide produced is isolated as an aqueous solution with concentrations varying from a few parts per million to over 9,000 parts per million. The process leading to this latter high concentration is an exception, and involves a recirculating loop to add new chlorine dioxide values to solutions already containing freshly generated chlorine dioxide. The aqueous concentrations of chlorine dioxide commonly used are in the range of 0.5 to 3,000 parts per million.

U.S. Pat. No. 2,678,922 prepares an aqueous solution of chlorine dioxide and flushes the chlorine dioxide from the solution with air. The chlorine dioxide-air stream is passed through liquid chlorine to provide a liquid chlorine/chlorine dioxide solution. The only other non-aqueous solutions of chlorine dioxide of which I am aware are U.S. Pat. Nos. 3,056,270 and 3,084,995 in which chlorine dioxide gas is dissolved in liquid carbon dioxide. The latter reference states that it has been proposed to prepare chlorine dioxide in carbon tetrachloride but this has not proven to be successful due to the slight solubility of chlorine dioxide and because of spontaneous decomposition.

Furthermore, the use of organic materials with chlorine dioxide is generally avoided. Hampel does report the reaction of aqueous chlorate solutions with aqueous solutions of aldehydes to produce chlorine dioxide. Aston reports the "unexpected" reactions of organic acid anhydrides with aqueous solutions of chlorates to produce chlorine dioxide. The *Merck Index*, Tenth Edition, 1993 provides the italicized warning "reacts violently with organic materials".

U.S. Pat. No. 4,105,546 discloses waste water containing oil is treated with an activated sludge. If sulfides are, present in the waste water, an oxidizing agent such as chlorine dioxide is added. The chlorine dioxide is present in a water/oil mixture and there is no disclosure of storage, stability, nor concentrations used.

PCT Publication No. WO 89/03179 discloses chlorine dioxide dissolved in water miscible organic solvents which are diluted with water for use. The reference, reports that satisfactory methods of storing and/or transporting chlorine dioxide have not been available and those disclosed have not been satisfactory. The reference further reports that aqueous solutions of chlorine dioxide decompose and the decomposition rates are too rapid to permit commercial utilization of neutral aqueous solutions of chlorine dioxide having a millimolar or greater composition. "Chlorine Dioxide: Chemistry and Environmental Impact of Oxychlorine Compounds" by W. S. Masschelein summarizes the known storage methods and emphasizes the problems encountered. Thus, because of the chemical instability, explosive character and lack of a satisfactory storage method, it has generally been necessary for chlorine dioxide to be manufactured at its place of use. The "Encyclopedia of Chemical Technology" by Kirk and Othmer, Vol. 3, page 696 (1949) Interscience Publishers, states that chlorine dioxide is a gas, which in high concentrations is very explosive, and in consequence, is generated only at the site of use.

The applicant is also aware of several publications in the literature which use chlorine dioxide. Japanese Patent Abstract 60-129122 adds an aqueous dispersion of naphthalene in xylene to an aqueous solution of sodium chlorite to eliminate the odor of chlorine dioxide generated by the decomposition of sodium chlorite during bleaching. Japanese Patent Abstract 60-101195 discloses "stabilized chlorine dioxide" added to cutting oil. "Stabilized chlorine dioxide", as is well known to persons skilled in the art, is an aqueous solution of chlorite and not actually chlorine dioxide as used in the present invention. Zesz, Nauk. Politech, Szczecin., Chem. (8) 105–15 (Chem. Abstr. 71 (15): 70256C) discloses the passage of gaseous chlorine dioxide through cyclohexane, benzene and toluene at 50° C.–55° C. to obtain reaction products. The motivation for the study was that the literature had no information on the action of gaseous chlorine dioxide on cyclic hydrocarbons and the study is an investigation of the chemistry of these reactions. Neither the storage of chlorine dioxide nor the preparation of a solution of chlorine dioxide in the solvents is disclosed. In Z. Wasser Abwasser Forsch (1984) 17(2) 50–62, an analytical method for up to 0.4 mg/l chlorine dioxide in water is disclosed in which the chlorine dioxide is extracted into hexane and then purged with nitrogen. A double extraction is required using 7–8 fold volumes of hexane. Storage of the solution is not disclosed.

Thus, despite the interest in chlorine dioxide and the numerous methods of generating chlorine dioxide, the preparation, storage and use of a broad range of concentrations of chlorine dioxide in a water-immiscible liquid has not been disclosed. In fact, the prior art very strongly teaches away from such a preparation.

SUMMARY OF THE INVENTION

Accordingly, it is a primary object of the present invention to provide a method of preparing and storing chlorine dioxide in a liquid which is non-aqueous and water-immiscible.

It is a further object of the present invention to provide chlorine dioxide of a very highly purity dissolved in a non-aqueous water-immiscible liquid hydrocarbon.

It is an additional object of the present invention to provide a stable solution of high concentrations of chlorine dioxide in a non-aqueous water-immiscible medium, said solution being useful as a reagent in oxidation, organic synthesis and for sterilizing and disinfecting purposes.

It is a still further object of the present invention to provide a method to obtain a highly purified aqueous solution of chlorine dioxide.

In accordance with the broad teachings of the present invention, there is herein illustrated and described, a method of preparing and storing for subsequent use a stable solution of chlorine dioxide in a non-aqueous water-immiscible liquid comprising the steps of preparing chlorine dioxide in an aqueous solution, adding a non-aqueous water-immiscible liquid to the aqueous solution. The mixture is agitated vigorously to extract the chlorine dioxide into the non-aqueous water-immiscible liquid. The mixture is allowed to separate into a non-aqueous phase containing chlorine dioxide and an aqueous phase. The separated non-aqueous phase containing chlorine dioxide is placed in a closed opaque container with the container providing a light-free environment to stabilize the chlorine dioxide for an extended period of time.

In further accordance with the teachings of the present intention, there is herein described a method of preparing and storing for subsequent use, a stable solution of chlorine dioxide in a non-aqueous, water-immiscible liquid. The steps include preparing gaseous chlorine dioxide and introducing the gaseous chlorine dioxide into the non-aqueous, water-immiscible liquid in an opaque container, closing-the container and providing a light-free environment to stabilize the solution of chlorine dioxide.

In another aspect of the present invention, there is disclosed a method of preparing a highly purified aqueous solution of chlorine dioxide free from salts, acid and chlorine. The method includes the steps of preparing an aqueous solution of chlorine dioxide, adding a non-aqueous water-immiscible liquid to the aqueous solution of chlorine dioxide thereby forming an aqueous phase and a non-aqueous phase. The non-aqueous liquid is substantially non-reactive with chlorine dioxide. The liquid phases, are agitated with the chlorine dioxide being extracted into and dissolved in the non-aqueous water-immiscible phase. The non-aqueous water-immiscible phase is separated from the aqueous phase, the non-aqueous, water-immiscible liquid containing chlorine dioxide being mixed with a desired volume of water, and the water and the non-aqueous, water-immiscible liquid containing chlorine dioxide being agitated. A first portion of the chlorine dioxide is dissolved in the water and a second portion of the chlorine dioxide is dissolved in the non-aqueous liquid. The water is separated from the non-aqueous, water-immiscible liquid thereby obtaining the aqueous solution of chlorine dioxide having a high purity free of salts, acid and chlorine.

These and other objects of the present invention will become apparent from a reading of the following specification, taken in conjunction with the enclosed drawings.

DESCRIPTION OF THE PREFERRED EMBODIMENTS

The present invention represents a departure from all other existing processes in that in the present invention, the chlorine dioxide is generated in an aqueous system, but immediately extracted into a water immiscible non-aqueous liquid hydrocarbon such as a non-aqueous solvent. It is also a departure from all other existing methods in that it rapidly and easily leads to the formation of solutions of chlorine dioxide in non-aqueous liquids at concentrations far higher than obtainable in water. It also represents a departure from all other systems in that the chlorine dioxide produced is very pure, and free of chlorite, chlorate, and hydrogen ion, none of which are soluble in non-polar organic solvents. Furthermore, the solutions generated are acid free (the concept of pH has no meaning in non-aqueous systems). The non-aqueous, water immiscible solution of chlorine dioxide is stable for a period of at least one month when stored in a closed container, and in a light-free environment. Thus, the present invention teaches the availability of chlorine dioxide which can readily be transported to a use site, and overcomes a longstanding problem in the industry.

The non-aqueous liquid must be substantially immiscible with water so that the liquid and the water are readily separated. The non-aqueous liquid may have a density greater than or less than water, to permit rapid separation. It is immaterial to the process whether, after separation, the aqueous phase is the upper layer or the lower layer of the two liquids.

Figure 1:
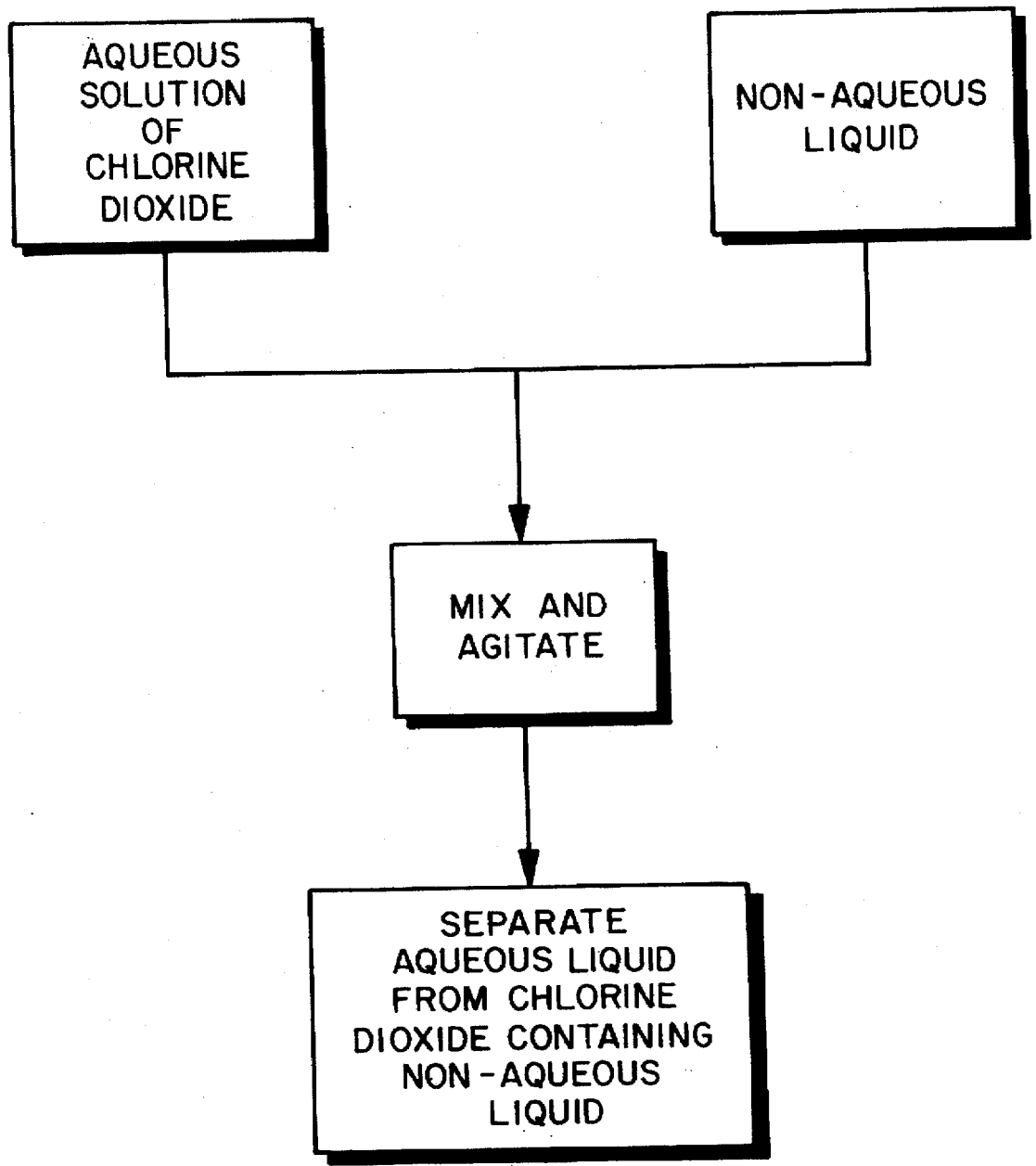
FIG. 1 is a block diagram showing the method of generating chlorine dioxide by the present invention.

Referring now to FIG. 1, the process comprises the providing of an aqueous solution of chlorine dioxide and providing a quantity of the non-aqueous liquid. The two liquids are mixed and agitated vigorously to effectively extract and dissolve the chlorine dioxide in the non-aqueous liquid. The aqueous liquid phase is then separated from the non-aqueous liquid phase to obtain the chlorine dioxide in the non-aqueous liquid.

The two phases referred to above are a water phase containing the ionic inorganic reactants which combine to form chlorine dioxide, and a water immiscible organic phase which acts to extract the uncharged molecular chlorine dioxide as formed. The organic phase performs two functions simultaneously; it acts to receive and dissolve the chlorine dioxide-gas generated in the aqueous phase, and it acts to separate chlorine dioxide from the inorganic precursors and by-products to lead to a contaminant free solution of chlorine dioxide with a purity unavailable from aqueous-only systems.

Figure 2:
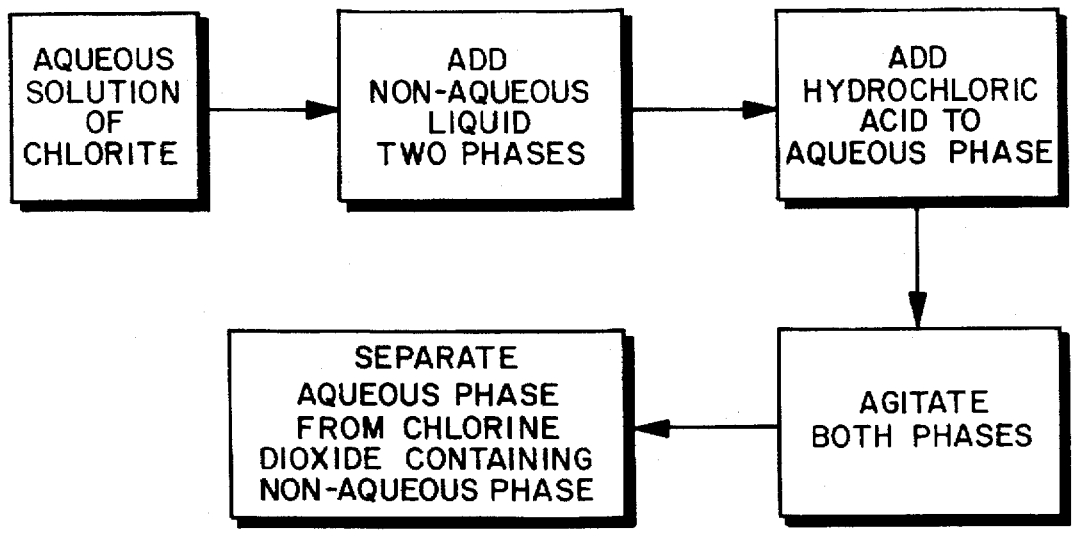
FIG. 2 is a block diagram showing a preferred method of generating chlorine dioxide of the present invention.

In a preferred embodiment, (FIG. 2) the process involves the addition of a water immiscible liquid with which the generated chlorine dioxide does not react, such as hexane, cyclohexane octane, benzene, xylene, or toluene to an aqueous solution of chlorite (preferably sodium chlorite) varying in concentration from less than 0.5% to 25%. Gasoline, diesel fuel and heavy aromatic naphtha also are usable, but are not preferred because the chlorine dioxide reacts with each over a period of hours. The organic solvent forms a separate phase from the water. Sodium chlorite is insoluble in the organic solvent, and remains in the water phase. The water phase is then acidified with hydrochloric acid, sulfuric acid, or any acid known to persons skilled in the art. Yellow chlorine dioxide is immediately formed, and by vigorous mixing, up to 93% of the formed chlorine dioxide is extracted preferentially into the organic phase. The more concentrated the aqueous phase, the greater the partitioning into the organic phase. Unreacted sodium chlorite, acid, and by-product sodium chloride are insoluble in the non-polar organic phase and remain in the water phase, leading to contaminant free chlorine dioxide.

The reaction of acid with aqueous sodium chlorite to produce chlorine dioxide is well known and does not constitute a new part of this invention. Maximum conversion of chlorite to chlorine dioxide from reaction of these two precursors is 80%. Other chlorites known to persons skilled in the art may be used in place of sodium chlorite. Sodium chlorite is provided as an example herein because of its ready availability and its comparatively low cost.

Under certain conditions, the reaction of chlorite with acid is known to produce chlorine as well as chlorine dioxide, chlorine being an undesirable product of a competing reaction. Chlorine reacts with many substances to produce chlorinated by-products, many of which are environmentally undesirable. Some of these chlorinated substances act as catalyst poisons. Further, aqueous chlorine is a less effective biocide than aqueous chlorine dioxide, the latter being two to four times more effective. This is especially important in commercial use of chlorine dioxide when diluted biocide is used. Unless high purity chlorine dioxide is available, which is free of comparatively high concentration of chlorine, the effectiveness of the sterilization and/or disinfecting procedure may be reduced. In addition, chlorine is much more corrosive than chlorine dioxide, especially in the presence of water, and through hydrolyses to form hydrochloric acid which produces low pH aqueous systems.

In the two-phase process of the present invention, the organic solvent is added to the aqueous chlorite solution and forms a discrete layer above or below the water, depending on its density. A volume of concentrated hydrochloric acid is added in one portion to the aqueous layer resulting in the formation of chlorine dioxide along with some by-product chlorine.

Both the chlorine dioxide and chlorine are soluble in the organic solvent and by means of vigorous agitation of the two liquid phases, an intimate mixture is created which allows the two molecular gases to be extracted and dissolved in the organic layer.

The chlorine dioxide is extracted in finished form with a single extraction. The chlorine is extracted as the chlorine molecule $Cl_2$, in which form it is free to react with unconverted chlorite remaining in the aqueous phase. The method of producing chlorine dioxide by reacting chlorine with an aqueous solution of a metal chlorite, is disclosed in U.S. Pat. No. 4,590,057.

This reaction results in removal of chlorine from the aqueous layer and conversion of chlorite to more chlorine dioxide by the following well-known route:

$$Cl_2 + 2NaClO_2 \rightarrow 2NaCl + 2ClO_2$$

By subjecting the two phases to sufficient agitation, to form an intimate mixture between the aqueous and non-aqueous organic phases, the chlorine dissolved in the organic phase can contact and react with the chlorite anion in the aqueous phase to generate more chlorine dioxide and consume by-product chlorine, leaving the organic phase chlorine-free.

Since water soluble ionic salts such as sodium chlorite precursor, hydrochloric acid, sodium chloride by-product, or any hypochlorite formed by reaction of generated chlorine with water cannot dissolve and be extracted by the organic phase, the resulting organic solution of chlorine dioxide is extremely pure.

The volume of non-aqueous solvent, such as hexane, ranged from approximately 80% of the volume of the aqueous phase to 400% the volume of the aqueous phase. Examples: 10 ml 15% chlorite, 40 ml water, plus 10 ml 15% hydrochloric acid extracted with 50 ml hexane; 10 ml 25% chlorite, plus 10 ml water, plus 5 ml 37% hydrochloric acid extracted with 100 ml hexane. The former system gave hexane solutions of extremely pure chlorine dioxide of 7824 mg/liter, whereas the latter gave a very pure solution with a concentration of 10,792 mg/liter. Addition of salt (sodium chloride) in excess of saturation to the latter allowed increased extraction to a solution having a chlorine dioxide concentration of 11,288 mg/liter, also with extremely high purity.

The following yields were obtained by the extraction process with non-aqueous liquid hydrocarbons as listed (without addition of sodium chloride). These data do not represent the maximum concentration obtainable with the respective non-aqueous liquid hydrocarbons.

| Non-Aqueous Liquid | mg $ClO_2$/liter | % Theoretical* |
| --- | --- | --- |
| Hexane | 10,972 | 59.0 |
| Cyclohexane | 11,264 | 60.5 |
| Octane | 1,822 | 9.7 |
| Benzene | 17,335 | 93.2 |
| Toluene | 5,059 | 27.2 |
| Xylene | 8,836 | 47.5 |
| Gasoline | 12,816 | 68.9 |
| Diesel | 4,182 | 22.4 |
| Heavy Aromatic Naphtha | 17,200 | 92.5 |

*Theoretical yield: 18600 mg/l for the volumes of reactants employed.

These concentrations of chlorine dioxide are significantly greater than have been reported by any of the references as being obtainable in aqueous solutions.

The method of analysis was that of Aieta et al (Journal Amer. Water Works Assn., Vol. 96, pp. 64–70, Jan. 1984). In this method, the sample containing chlorine dioxide is added to a mixture of solid potassium iodide crystals and pH 7 buffer. The chlorine dioxide oxidizes iodide to iodine, and the formed iodine is titrated with 0.1 Normal sodium thiosulfate (NTS). Either a starch/iodine or amperometric endpoint is used to determine equivalence. The chlorine dioxide is reduced to chlorite ion, which is not an oxidant at pH 7. Any oxidant detected at pH 7 will be only chlorine dioxide or unreacted contaminating chlorine. The contents of the titration container are acidified to pH 1.5–2, by adding dilute hydrochloric acid. This activates the chlorite formed in the first step of the titration and causes it to oxidize the contained iodide ion, restoring the blue starch/iodine color (or activating the meter on the amperometric titrator). Each chlorite ion requires four electrons to neutralize it. Because of the relative oxidation capacities of chlorine dioxide and chlorite, the second titration should require four times the titrant required for the first if the chlorite present comes solely from chlorine dioxide. Therefore, the closer the ratio of the second titration volume to the first titration volume is to 4, the higher the purity of the chlorine dioxide. A value above 4 indicates excess chlorite present during the pH 7 titration (not possible in this process because the chlorite anion will not extract into the hexane, which automatically gives chlorite-free chlorine dioxide, a major processing advantage). A value below 4 indicates there was chlorine impurity present during the pH 7 titration. The analytical method has an accuracy of approximately ±5%.

EXAMPLE I

The following materials are provided:
1. 25% by weight aqueous solution of chlorite such as commercial grade sodium chlorite.
2. Additional chlorine dioxide demand-free water.
3. Concentrated hydrochloric acid (37%).
4. A substantially water immiscible non-aqueous liquid hydrocarbon (organic solvent) such as:
   hexane
   cyclohexane
   octane
   benzene
   toluene
   xylene
   gasoline
   diesel
   heavy aromatic naphtha (a common solvent used in the petroleum industry)

The water immiscible solvent is added to the aqueous chlorite solution of the desired concentration at room temperature. Acid is added to the aqueous chlorite solution of the desired concentration. The aqueous phase and the liquid phase are vigorously agitated. The aqueous and non-aqueous phases are separated.

The range of chlorite solutions used was from 1 ml in 49 ml water (0.5%) to 10 ml chlorite plus 10 ml water (12.5%). Concentrations up to 25% may be used if adequate safety precautions are taken.

In this respect, it should be carefully noted that the chlorine dioxide is light sensitive and spontaneously reacts exothermically to produce chlorine and oxygen. The induction period varies as a function of the solvent and the amount of oxygen present in the atmosphere above the organic base. With hexane, the time was approximately 1–5 minutes and with cyclohexane, the time was 15–30 minutes. As will be described, it is highly recommended that the procedure herein be conducted in a light-free environment or that, if glass containers are used, that the glass be colored to significantly reduce the exposure of chlorine dioxide to light.

The concentration range used for the hydrochloric acid added was from 15% to full strength (37%).

The pH range over which hexane extractions were successful form the three component mixture, 25% chlorite, water, and hydrochloric acid, was 0.72 for the very dilute systems, to 0.24 for the system employing 10 ml 25% chlorite, 10 ml water and 5 ml concentrated (37%) hydrochloric acid. Early indications are that additional acid (another 5 ml of 37% acid) in this system does not increase yield significantly. The purity of the chlorine dioxide from the very dilute preparation was below the high purity easily achieved with the more concentrated systems; the extractant from acidified 0.5% chlorite had significant chlorine impurity even after aggressive agitation, so it appears chlorite concentration is an important factor influencing chlorine dioxide purity from this process.

The non-aqueous liquid may be an aliphatic, an aromatic, or a mixture of aliphatic and aromatic liquids. The criteria for the non-aqueous liquid is that it be substantially immiscible with water, substantially non-reactive with chlorine dioxide and substantially non-reactive with chlorine. The non-aqueous liquid is not limited to the liquids described herein but these liquids are listed as having been found to be satisfactory.

Figure 3:
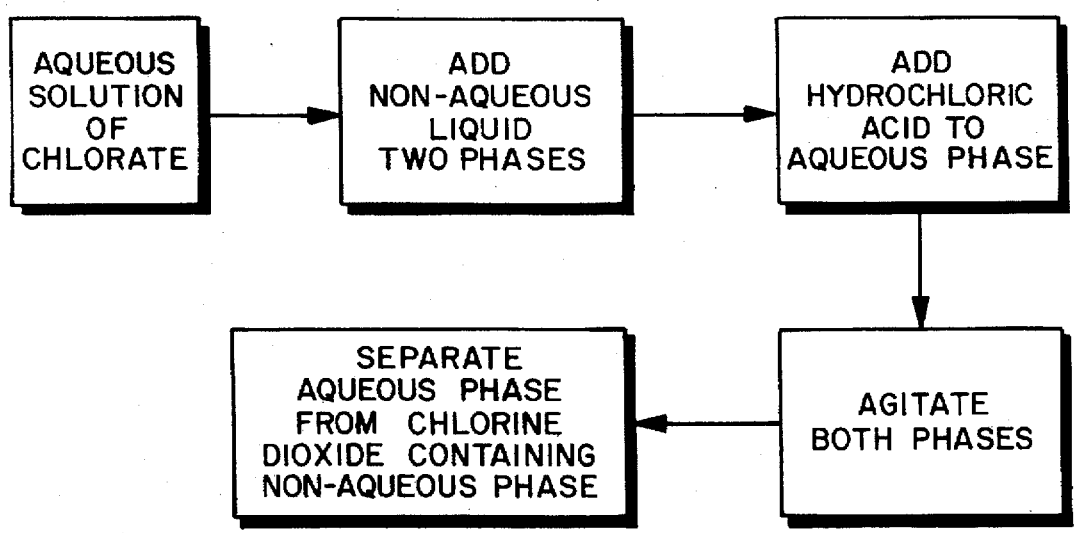
FIG. 3 is a block diagram showing an alternate method of generating chlorine dioxide by the present invention.

The method of preparation of chlorine dioxide in the aqueous phase is not limited to the reaction of chlorite with acid (FIG. 3). For example, chlorine dissolved in water (hypochlorous acid) reacts with chlorite (U.S. Pat. No. 4,250,144). Molecular chlorine reacts directly with sodium chlorite solutions. Chlorates have also been widely used for preparation of chlorine dioxide. An electrolytic cell process wherein sodium chlorate is reacted with hydrochloric acid and heat is disclosed in U.S. Pat. No. 3,920,801. Chlorine dioxide is produced by the reaction of sodium chlorate, sulfuric acid and methanol in U.S. Pat. No. 4,081,520. Any method of producing an aqueous solution of chlorine dioxide known to persons skilled in the art may be used in the process of the present invention. However, procedures which are less efficient in the production of chlorine dioxide and which also produce chlorine as a by-product, are less desirable where high purity chlorine dioxide is desired. This is because the chlorine is also soluble, to varying extents, in the non-aqueous liquid.

Figure 4:
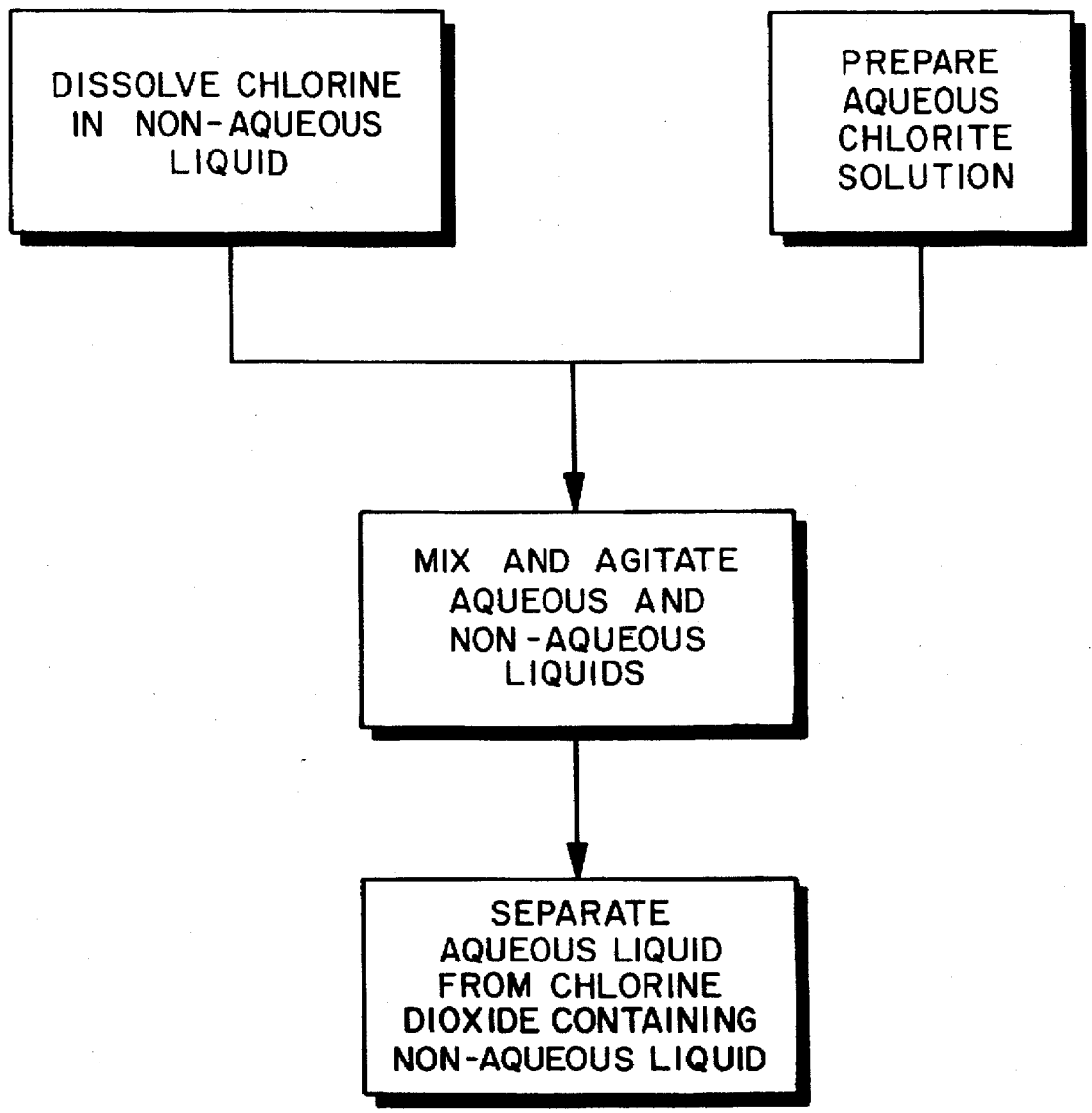
FIG. 4 is a block diagram showing another preferred method of generating chlorine dioxide by the present invention.

In another preferred embodiment, as shown in FIG. 4, a solution of chlorine is prepared in the non-aqueous, substantially water immiscible-liquid with which chlorine is substantially non-reactive. An aqueous solution of chlorite is provided and the aqueous liquid is mixed and agitated with the non-aqueous liquid. Chlorine dioxide is formed by the reaction of chlorine with chlorite.

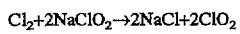

$$Cl_2 + 2NaClO_2 \rightarrow 2NaCl + 2ClO_2$$

The chlorine dioxide is dissolved and extracted with the non-aqueous liquid in high concentration. The separation is efficiently effected with a single extraction.

EXAMPLE II

A 10 ml volume of 12.5% sodium hypochlorite is added to 40 ml of distilled water to make a total of 50 ml solution in a separatory funnel, and 50 ml of hexane added to the funnel.

A 5 cc portion of 15% hydrochloric acid was added to the two-phase system in the funnel, and the mixture agitated vigorously. Yellow molecular chlorine was formed by the reaction of hypochlorite with acid. (The mixing of hypochlorite with acid is a standard method for preparation of chlorine gas).

The aqueous layer was discarded. To the intensely yellow hexane solution of chlorine was added a solution composed of 10 ml 25% sodium chlorite plus 40 ml distilled water. The mixture was shaken vigorously for approximately five minutes to give the molecular chlorine in hexane sufficient opportunity to mix intimately with the aqueous chlorite solution. The chemistry for the reaction between chlorine and chlorite is well known except that in the prior art, free gaseous chlorine is contacted with the chlorite, whereas in the present invention, the molecular chlorine is present as a gas dissolved in hexane.

The aqueous layer containing unreacted chlorite and sodium chloride by-product is discarded. The hexane layer contains chlorine-free chlorine dioxide.

Analysis of this solution is used to determine both the chlorine dioxide concentration, and the purity. The method employed is the method of Aieta, et al.

In analyzing the sample prepared above, the first titration required 1.15 ml of 0.1N NTS. After acidification, the second titration required 4.62 ml of 0.1N NTS. This gave a ratio of 4.62/1.15=4.017, indicating the produced chlorine dioxide concentration of the hexane solution was 7757 mg/liter. This also indicates that the chlorine dioxide is of very high purity.

As described above under Example I, the alternate embodiment of Example II also provides highly purified chlorine dioxide free of chlorites, chlorates, hypochlorites, acid and water soluble ionic salts since these reactants and by-products are soluble in water and insoluble in the non-aqueous phase. Further, excess chlorite in the aqueous phase and continued extraction permits further reaction with the chlorite of any residual chlorine in the non-aqueous phase to increase the efficiency and the yield of the process. The higher the concentration of chlorite in the aqueous phase, the more rapid is the reaction with molecular chlorine. In addition, as previously described, addition of sodium chloride to the aqueous phase also increases the yield of chlorine dioxide.

In order to determine the storage stability of chlorine dioxide in the non-aqueous, water immiscible solvent, a hexane solution containing 11,129 mg chlorine dioxide per liter was prepared. Aliquots were taken and stored in closed brown glass bottles and in clear glass bottles, under refrigeration at approximately 4° C. and at ambient temperature, in ambient light and in the dark. After 32 days, the stored aliquots were analyzed for chlorine dioxide content. The results obtained are in Table I.

TABLE I

| Sample | Bottle | Light Conditions | Temp. | Concentration | B/A |
|---|---|---|---|---|---|
| 1A | Brown | Dark | Refrig. | 11,264 ppm | 4.0 |
| 2A | Brown | Dark | Refrig. | 10,590 | 3.9 |
| 3A | Brown | Light | Room | 6,273 | 3.89 |
| 4A | Brown | Light | Room | 6,543 | 3.56 |
| 5A | Clear | Dark | Refrig. | 10,792 | 4.03 |
| 6A | Clear | Dark | Refrig. | 10,320 | 3.97 |
| 7A | Clear | Light | Room | 0 | |
| 8A | Clear | Light | Room | 0 | |
| 9A | Brown | Dark | Room | 6,420 | NA |

The B/A value is the ratio of chlorite to chlorine dioxide, and is a measure of purity. One ion of chlorite is produced for each molecule of chlorine dioxide. Chlorite requires four times the titrant per ion than does chlorine dioxide. Therefore, a ratio of 4.0 indicates a good match of chlorite to chlorine dioxide, indicating the chlorine dioxide was pure and contained no chlorine, which would lower the titer below 4.0, or chlorite, which would raise it above 4.0.

These results clearly indicate it is necessary to store the concentrated chlorine dioxide/hexane solutions in a light-free environment in a container having opaque, light resistant walls and refrigerated to maintain maximum chlorine dioxide concentration. When stored under these conditions, after one month, the concentration of chlorine dioxide is at least 90% of the initial concentration. Even if not refrigerated and stored in a light-free environment, the concentration loss is less than 50% and a respectable concentration of chlorine dioxide remains in the container.

The samples in clear glass in room light soon change to a water-white hexane solution with an oily clear liquid adhering to the glass. It is believed that this is a chlorinated hexane derivative produced by the light-induced decomposition of chlorine dioxide to chlorine and oxygen with the photolytically activated chlorine attacking the hexane and substituting chlorine for hydrogen.

Figure 5:
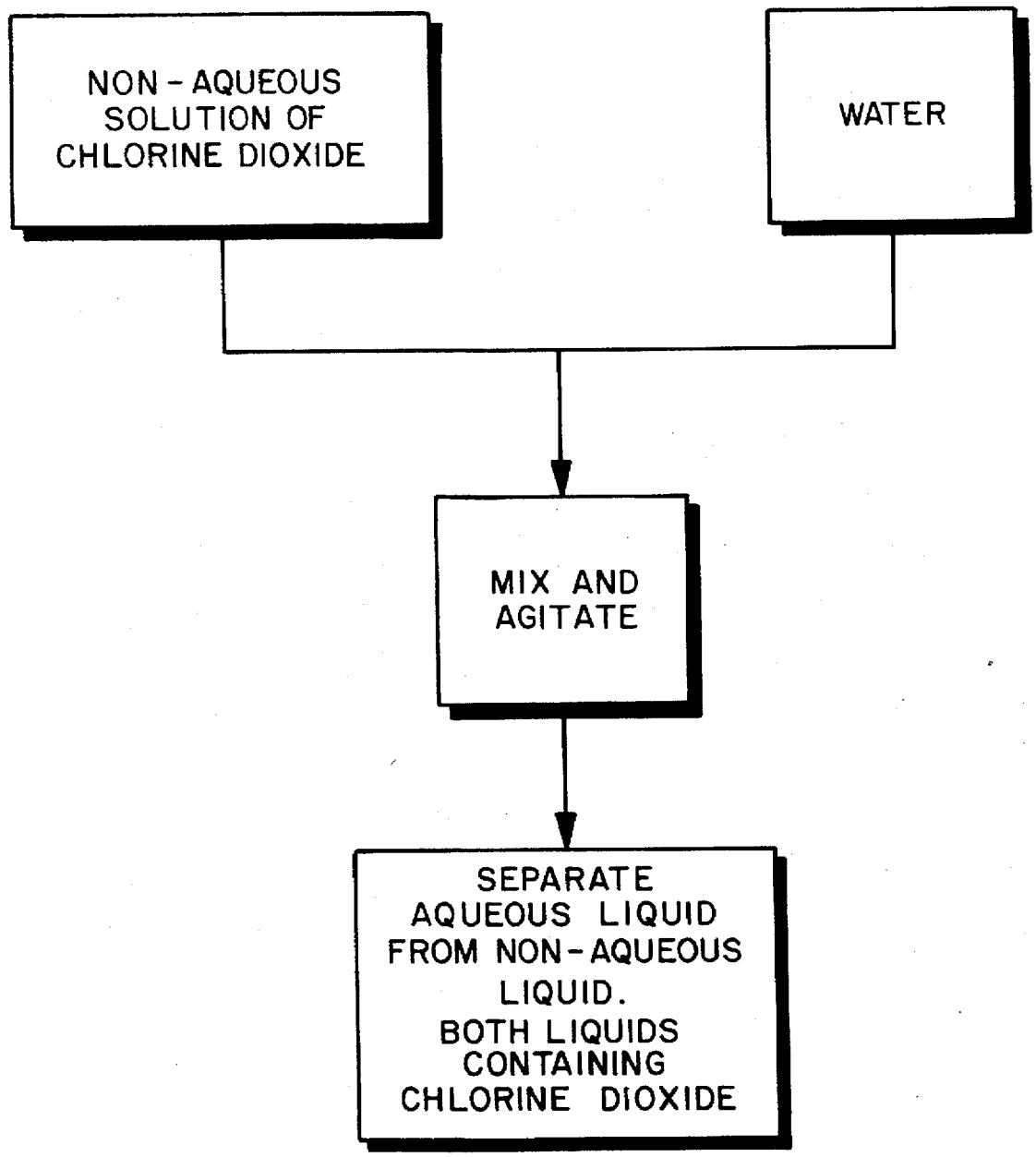
FIG. 5 is a block diagram showing a method of preparing an aqueous solution of chlorine dioxide by the present invention.

The non-aqueous solution of highly purified chlorine dioxide may further be used to prepare very pure aqueous solutions of chlorine dioxide (FIG. 5). The non-aqueous solution of chlorine dioxide is mixed and vigorously agitated with water. In a preferred method, an equal volume of distilled water is used. Depending upon the particular non-aqueous liquid used, and the preferential solubility of chlorine dioxide in the pure, salt free water vs. the selected solvent, varying concentrations of chlorine dioxide in water may be obtained.

EXAMPLE III

Extraction of 100 ml of hexane containing 9105 mg/l chlorine dioxide dissolved therein with 100 ml of distilled water resulted in formation of an aqueous solution containing 4722 mg/l chlorine dioxide, leaving a hexane solution containing 3912 mg/l chlorine dioxide. After mild acidification (to approximate pH 5.0 with hydrochloric acid) and seven days storage in brown glass, the aqueous solution contained 4,788 mg/l chlorine dioxide. The apparent increase in concentration of chlorine dioxide in the aqueous solution is due to the experimental error and accuracy of the analytical method.

Extraction of the non-aqueous liquid containing chlorine dioxide with distilled water is preferred since the presence of salts and dissolved substances in the water decreases the solubility of chlorine dioxide in the aqueous phase. With some solvents, chlorine dioxide has been found to be more soluble in pure salt-free water than in the non-aqueous liquid; that is the partition favors pure water over pure solvent. The relative volume of the aqueous phase compared to the non-aqueous phase is not critical for extraction into the water but is a factor with respect to the amount of chlorine dioxide which the aqueous phase is capable of dissolving.

The advantage of this method of preparing aqueous solutions of chlorine dioxide over methods previously disclosed in the prior art is that the chlorine dioxide is pure and the aqueous solution has no chlorine, chlorites, chlorates, hydrochlorates or other reaction precursors or by-products present. Also, the chlorine dioxide can be obtained at a relatively high concentration. Of course, the solution can be further diluted with water if a lower concentration is desired. Further, if properly stored, the aqueous solution is stable for at least several months with substantially no reduction in the concentration of the chlorine dioxide.

Figure 6:
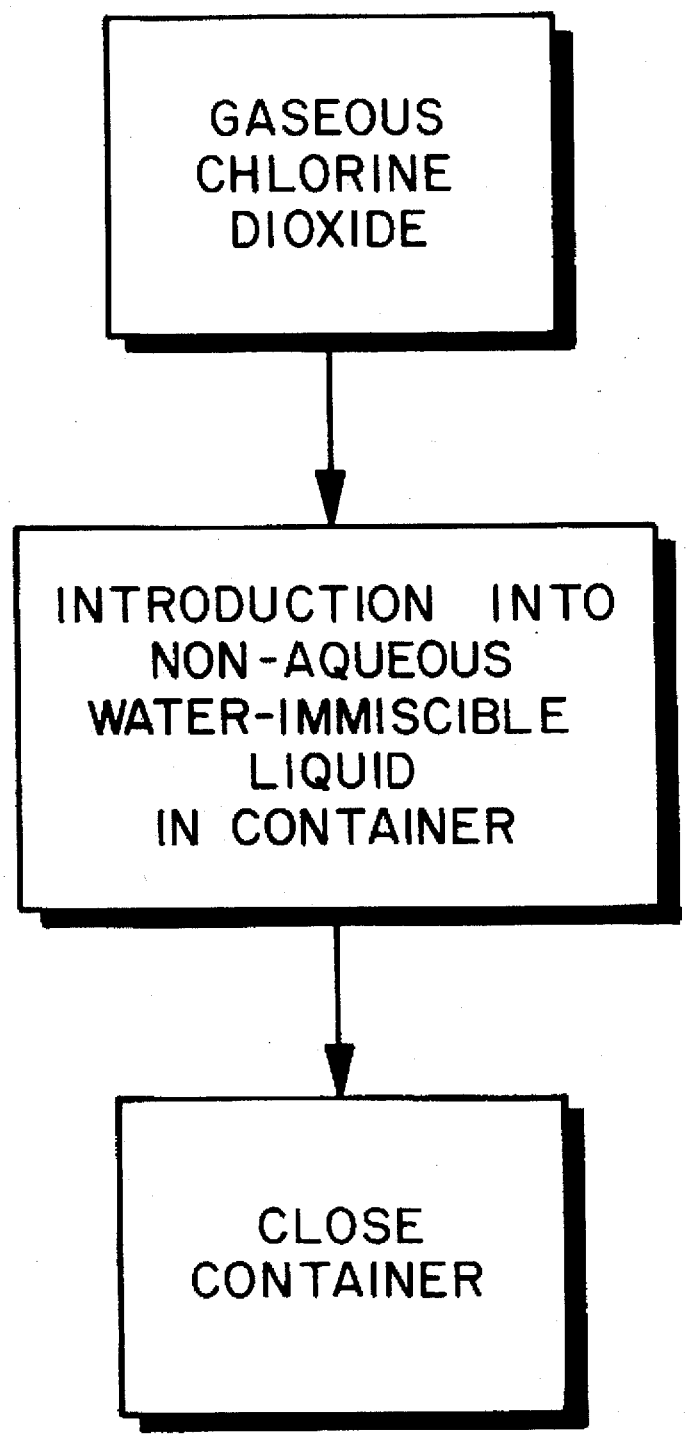
FIG. 6 is a block diagram showing a method of preparing a solution of chlorine dioxide in a non-aqueous, water-immiscible liquid by introducing gaseous chlorine dioxide into the liquid.

In an alternate embodiment (FIG. 6), gaseous chlorine dioxide is introduced directly into the non-aqueous, water-immiscible liquid at room temperature but preferably at approximately 5° C. The air-free gaseous chlorine dioxide may be generated by any method known to persons skilled in the art. Preferably, the chlorine dioxide is of high purity with a minimum amount of gaseous chlorine present. The gaseous chlorine dioxide is directed from the generator or source through a tube and bubbled into the non-aqueous, water-immiscible liquid which is in a container. The passage of the gaseous chlorine dioxide is continued until a desired concentration of chlorine dioxide in the liquid is obtained. The non-aqueous water-immiscible liquid is preferably a hydrocarbon including aliphatic hydrocarbons such as hexane, cyclohexane, octane; aromatic hydrocarbons such as benzene, toluene, xylene and mixed aliphatic/aromatic hydrocarbons such as gasoline, and diesel fuel. Concentrations of approximately 11,000 mg $ClO_2/l$ are obtained with hexane and cyclohexane. Concentrations of approximately 17,000 mg $ClO_2/l$ are obtained with benzene and heavy aromatic naphtha. The concentrations with all the non-aqueous, water-immiscible liquids is approximately the same as obtained in the water extraction method as previously described. The container with the chlorine dioxide dissolved in the non-aqueous, water-immiscible liquid is closed and has a storage stability substantially the same as the chlorine dioxide solutions described previously for chlorine dioxide separated from aqueous solutions. Storage at 4° C. provides extended storage with slight loss in activity over a period of at least one month. Storage in a light-free environment provides increased stability over storage when exposed to light as described previously. The water free, gaseous method of preparing the chlorine dioxide solution provides a product which is free of salts and contains a minimum amount of chlorine.

These methods, therefore, represent a rapid, new means to obtain pure solutions of high concentrations of chlorine dioxide in organic solvents. These methods open up new routes to the use of chlorine dioxide as a reactant in non-aqueous organic synthesis, as well as a means to production of chlorine dioxide in a form never available before, in which form it may serve both as a reactant and as an oxidant in water-free systems. Further, an even wider use can be found for chlorine dioxide as a biocide and a sterilizing and disinfecting agent.

These methods also represent means for making chlorine dioxide available to any chemist equipped with the most rudimentary chemical equipment, so that any chemist skilled in the most basic arts of chemistry and taking adequate precaution can now make pure, chlorine- and chlorite-free solutions of chlorine dioxide for investigative or commercial purposes.

In those commercial applications for sterilizing and disinfecting a surface with chlorine dioxide, the chlorine dioxide stock solution (2,000 mg to 17,000 mg) as prepared and stored in a water-immiscible non-aqueous liquid according to present invention, can be transported to the site in a container. At the site the stock, concentrated chlorine dioxide solution can be diluted with the water-immiscible non-aqueous liquid to a desired concentration sufficient to provide adequate amounts of chlorine dioxide to disinfect and sterilize. Effective sterilization or disinfection can be achieved by the application to the surface with as little as approximately 0.5 ppm of chlorine dioxide although slightly higher concentrations are preferred. PCT Publication No. WO 89/03179 reports that as little as 1 ppm chlorine dioxide in aqueous solution will destroy 99,999 of 100,000 *E Coli* upon contact for five minutes. Thus, the extremely high concentrations of chlorine dioxide (up to 17,000 mg/l) disclosed by the present invention provide a previously unknown stable source of chlorine dioxide economically and conveniently available for transport to a use site. An example of such use could be in a storage tank of non-aqueous fuel (thousands of gallons) in which certain bacteria are growing. The addition of chlorine dioxide in a non-aqueous liquid, as taught by the present invention, which is miscible with the fuel and is thereby diluted to obtain approximately 0.5–50 ppm chlorine dioxide in the storage tank, can destroy the bacteria without affecting the fuel. This convenience and effectiveness is greatly needed by the industry which would require the complex and expensive equipment to generate chlorine dioxide at a site.

The methods also represent means for manufacturing high concentration solutions of chlorine dioxide in organic solvents which may have commercial value in and of themselves. A method for preparation of aqueous chlorine dioxide of high purity and excellent storage stability is disclosed.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A method of preparing and storing for subsequent use, a stable solution of chlorine dioxide in a non-aqueous, water-immiscible hydrocarbon liquid comprising the steps of preparing chlorine dioxide in an aqueous solution, adding a non-aqueous water-immiscible hydrocarbon liquid to the aqueous solution and agitating the mixture vigorously to extract a concentration of chlorine dioxide into the non-aqueous water-immiscible hydrocarbon liquid in an amount sufficient to form a concentration of chlorine dioxide ranging from 1,822 to 17,200 mg/l in said liquid, allowing the mixture to separate into a non-aqueous water-immiscible hydrocarbon phase containing chlorine dioxide and an aqueous phase, placing the separated non-aqueous water-immiscible hydrocarbon phase containing said chlorine dioxide in a closed, opaque container, with the container providing a light-free environment to stabilize the chlorine dioxide for a period of at least one month of storage.

2. The method of claim 1, wherein the container containing said chlorine dioxide is stored at a temperature of approximately 4° C.

3. The method of claim 1, wherein the volume of non-aqueous, water-immiscible hydrocarbon liquid to the volume of the water ranges from approximately 0.8 to 4.0 times the volume of the water.

4. The method of claim 1, wherein a single extraction is performed, with the single extraction being sufficient to efficiently extract an amount of the chlorine dioxide into the non-aqueous liquid effective for sterilizing and disinfecting.

5. The method of claim 1, wherein the non-aqueous, water immiscible hydrocarbon liquid is an aliphatic hydrocarbon.

6. The method of claim 1, wherein a concentration of chlorine dioxide dissolved in the non-aqueous water-immiscible hydrocarbon liquid and stored at ambient temperature retains at least one-half of its original concentration.

7. A method of preparing chlorine dioxide in a non-aqueous water-immiscible hydrocarbon liquid comprising the steps of dissolving chlorine in a non-aqueous water-immiscible hydrocarbon liquid, the non-aqueous water-immiscible hydrocarbon liquid being substantially non-reactive with chlorine and substantially non-reactive with chlorine dioxide; providing an aqueous solution of about 0.5% to 25% by weight of chlorite; mixing and agitating the non-aqueous water-immiscible hydrocarbon liquid and the aqueous solution wherein the chlorine and the chlorite react to form chlorine dioxide; with 2,000 mg to 17,000 mg chlorine dioxide per liter being extracted into and dissolved in the non-aqueous water-immiscible hydrocarbon liquid and being isolated therein; separating the aqueous solution from the non-aqueous water-immiscible hydrocarbon liquid, with the chlorine dioxide in the non-aqueous water-immiscible hydrocarbon liquid being of high purity, substantially free of chlorite and chlorine, and storage stable for at least one month.

8. The method of claim 7 wherein the non-aqueous water-immiscible hydrocarbon liquid containing chlorine dioxide is stored in a closed container in a substantially light-free environment.

9. The method of claim 8 wherein the non-aqueous water-immiscible hydrocarbon liquid containing chlorine dioxide is stored in a refrigerated environment wherein the concentration, after one month, remains at approximately 90% of the initial concentration.

10. A method for disinfecting and sterilizing a surface comprising the steps of dissolving by an extraction process about 2,000 mg to 17,000 mg of chlorine dioxide per liter of non-aqueous, water-immiscible hydrocarbon liquid to provide a concentrated solution, said concentrated solution stable for at least one month when stored in a light-free environment, diluting the concentrated solution with an additional volume of the non-aqueous water-immiscible hydrocarbon liquid to provide a concentration of chlorine dioxide sufficient to disinfect and sterilize and applying said diluted solution of chlorine dioxide to the surface to be disinfected and sterilized.

11. The method of claim 10, wherein the amount of chlorine dioxide in the diluted solution is approximately 0.5 to 50 ppm.

12. A method of preparing a highly purified aqueous solution of chlorine dioxide free from salts, acid, and chlorine, comprising the steps of preparing an aqueous solution of chlorine dioxide, adding a non-aqueous water-immiscible hydrocarbon liquid to the aqueous solution of chlorine dioxide thereby forming an aqueous phase and a non-aqueous water-immiscible liquid hydrocarbon phase, the non-aqueous water-immiscible hydrocarbon liquid being substantially non-reactive with chlorine dioxide; agitating the liquid phases, the chlorine dioxide being extracted into and dissolved in the non-aqueous water-immiscible liquid hydrocarbon phase; separating the non-aqueous water-immiscible liquid hydrocarbon phase from the aqueous phase thereby obtaining a non-aqueous water-immiscible liquid hydrocarbon containing chlorine dioxide; mixing the non-aqueous, water-immiscible hydrocarbon liquid containing chlorine dioxide with a volume of water; agitating the water and the non-aqueous, water-immiscible hydrocarbon liquid containing chlorine dioxide, wherein a first portion of the chlorine dioxide is dissolved in the water and a second portion of the chlorine dioxide is dissolved in the non-aqueous water-immiscible hydrocarbon liquid, and separating the water from the non-aqueous, water-immiscible hydrocarbon liquid thereby obtaining the aqueous solution of chlorine dioxide having a high purity free of salts, acid and chlorine.

13. A method of preparing, storing, and using a stable solution of chlorine dioxide comprising the steps of:

dissolving chlorine dioxide in a non-aqueous water-immiscible hydrocarbon liquid at a concentration of 1,822 to 17,200 mg/l in said liquid by an extraction process, said liquid being substantially non-reactive with chlorine dioxide;

placing the non-aqueous water-immiscible hydrocarbon liquid containing the chlorine dioxide in a closed container, the container being made of a material which prevents the transmission of light therethrough;

storing the closed container with the non-aqueous water-immiscible hydrocarbon liquid containing the chlorine dioxide therein for at least one month;

shipping the non-aqueous water-immiscible hydrocarbon liquid containing the chlorine dioxide in the closed container to a work site;

opening the closed container at the work site and diluting said liquid with a non-aqueous water-immiscible hydrocarbon liquid to a concentration of 0.5 ppm to 17,000 ppm, wherein said concentration is effective for sterilizing and disinfecting.

* * * * *